July 3, 1923.

J. J. McCRACKEN

STAR IDENTIFICATION PROTRACTOR

Filed July 16, 1920   2 Sheets-Sheet 1

1,460,387

Inventor.
John J. McCracken

July 3, 1923.
J. J. McCRACKEN
1,460,387
STAR IDENTIFICATION PROTRACTOR
Filed July 16, 1920   2 Sheets-Sheet 2
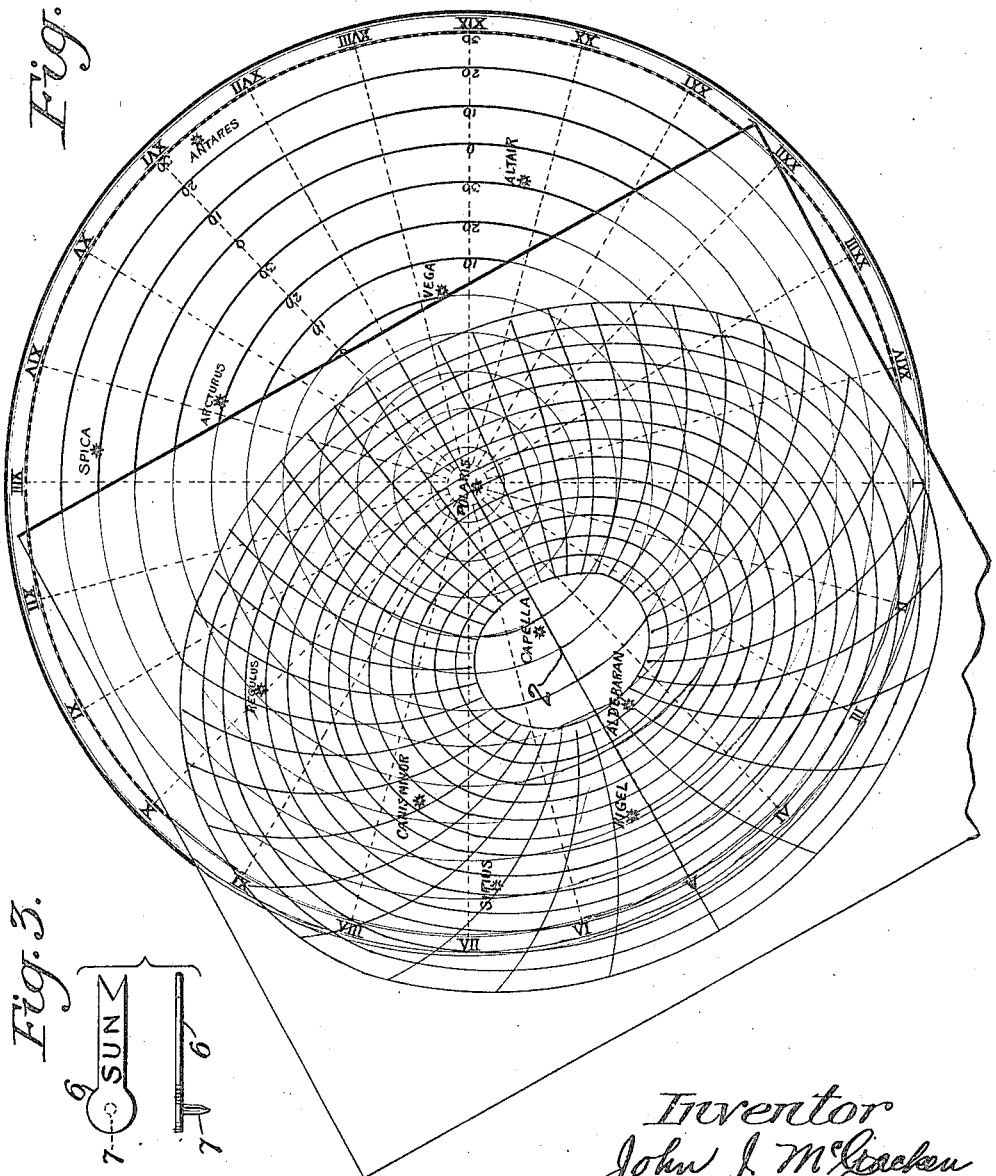
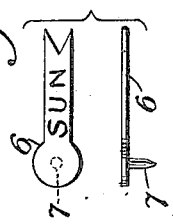
Inventor
John J. McCracken
By Chas. J. O'Neill
Atty.

Patented July 3, 1923.

1,460,387

UNITED STATES PATENT OFFICE.

JOHN JAMES McCRACKEN, OF NORFOLK, VIRGINIA.

STAR IDENTIFICATION PROTRACTOR.

Application filed July 16, 1920. Serial No. 396,832.

*To all whom it may concern:*

Be it known that I, JOHN J. MCCRACKEN, a citizen of the United States, residing at Norfolk, county of Norfolk, State of Virginia (whose post-office address is Magnolia and Carroll Streets, Larchmont, Norfolk, Virginia), have invented certain new and useful Improvements in Star Identification Protractors; and I do hereby declare the following to be a full, clear, and exact description of the invention, such as will enable others skilled in the art to which it appertains to make and use the same.

This invention relates to a star identification protractor adapted for use in connection with the Hydrographic Office star charts of the Navy Department and will definitely identify the navigational stars by means of their altitudes and azimuths.

Theoretically a protractor for each degree of latitude is necessary and it is the salient object of this invention to provide a protractor which may be used for all latitudes between thirty and sixty degrees, on the Hydrographic Office star chart of either the Northern or Southern Hemispheres, which will be sufficient for all general and practical purposes.

It is for the purpose of obviating these repeated calculations for each degree of latitude, that the present protractor forming the subject matter of this invention has been devised.

With this improved protractor a navigator, by calculating the local sideral time and with the local latitude as arguments, may obtain the approximate altitude of any navigational star shown on the Hydrographic Office chart, as well as its azimuth for any particular time desired, for example, sunrise and sunset. The advantage of this is to enable the navigator to pick out stars whose azimuths are from fifty to ninety degrees apart and by setting the sextant for the altitude, he can generally pick up the star with said sextant while the horizon is good, even when the star cannot be seen with the naked eye.

In devising this improved star protractor, with reference to the Hydrographic Office star chart, applicant has selected a latitude of forty degrees and by constructing the altitude and azimuth curves for that latitude the protractor may be used for all latitudes between thirty and sixty degrees, the scale of the protractor being the same as the Hydrographic Office chart. Since the navigational stars are large and sufficiently far apart, accuracy greater than five degrees altitude and ten degrees azimuth is not necessary for identification.

The Hydrographic Office chart being a stereographic projection on the plane of the equator, the altitude circles for any zenith projections at a particular time will be projected as ellipses, so that by projecting the zenith of the observer for a latitude of forty degrees and by calculating three points of the ellipse for each five degree change of latitude, we may draw in the projection of the altitude circles. By next calculating the declination and hour angle for each five degrees of altitude and ten degree change of azimuth, indicating these points, and then drawing a line through them on a fair curve the azimuth curves will be produced, which is a method used in constructing the various ellipses and curves on the protractor illustrated in the accompanying drawings, to be hereinafter more fully referred to.

The above calculations have all been made with reference to the hydrographic star chart but instead of drawing these curves on the chart itself, they are put on transparent material such as celluloid, tracing cloth, or the like, which will allow the same to be repeatedly used by simply moving the curves to correspond to the changes in local sideral time and local latitude, without each time going through all of the above calculations.

In order that the entire heavens, stereographically illustrated on the star chart, will be complete and accurate with respect to the various planets, such as the sun, moon, Jupiter, Mars, Neptune, and the like, at the particular time of taking the readings, I have provided movable markers or semaphores which may be moved about on the star chart and placed in their proper positions. It being a well known fact that the right ascension of the sun and moon and the various other planets being variable, as well as their declinations, they are not shown on the Hydrographic Office star chart, but by checking up upon looking in the Nautical Almanac and picking out their right ascension and declination the various markers may be put on the chart and thereby complete the entire heavens for navigational purposes.

In the accompanying drawings:—

Fig. 2 is a representation of a Hydrographic Office star chart of the Northern Hemisphere illustrating thereon, a few of the principal navigational stars with the protractor superimposed thereon and in working relation thereto; and, Fig. 3 illustrates an enlarged view of the preferred form of one of the markers, each of which having indicated thereon one of the various planets.

Figure 1:
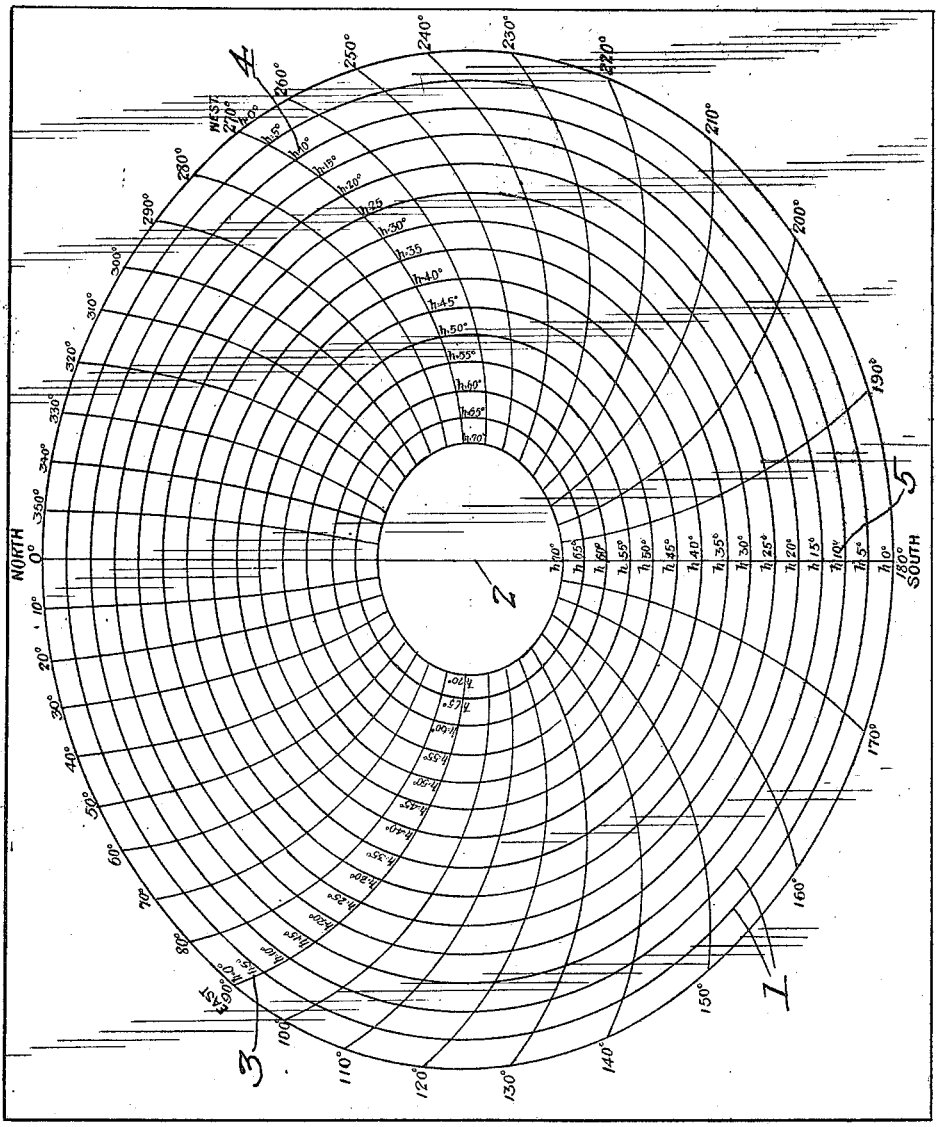
Fig. 1 illustrates my improved protractor.

Referring to the drawings in detail, the protractor illustrated in Fig. 1 which is adapted to be made preferably of light transparent material such as celluloid, tracing cloth or the like, is provided with a series of ovals or ellipses 1, graduated from the outer ellipse or edge of the protractor indicated as zero degree to the inner or smaller ellipse at the center thereof indicated at seventy degrees. These ellipses correspond to the projected altitude circles on the hydrographic star chart but are ellipses and not circles. As hereinbefore stated the hydrographic star chart being a stereographic projection on the plane of the equator, the various altitudes thereon are projected in circles, but the altitude circles projected from a zenith not on the equator, will be projected as ellipses, as shown on the protractor illustrated in the drawings, which protractor has been evolved by projecting the zenith of the observer on a latitude of forty degrees, which zenith is indicated at 2. By further calculating three points of the ellipse for each five degree change of latitude, as shown by the graduations at 3, 4 and 5, we may draw in the projections of the altitude circles, or in reality ellipses calculated from a latitude of forty degrees on the hydrographic star chart.

In Fig. 3 I have illustrated a movable marker or semaphore 6 provided with a pointed projection or pin 7, which marker has indicated thereon one of the various planets, there being a marker or semaphore for each planet. These markers are provided for use in connection with the Hydrographic Office star chart and the improved form of protractor, herein described, and are for the purpose of indicating on the Hydrographic Office star chart the positions of said planets. These planets are not shown on the star chart for the obvious reason that their positions determined by the right ascension and declinations of each planet, are variable. Their relative positions, however, can be checked up and determined upon reference to the Nautical Almanac at the time desired, so that when the protractor is used the various planets can be indicated on the chart by sticking the markers in their proper places thereon, which will enable the navigator to complete the entire heavens and avoid confusion and prevent mistaking the planets for the larger stars, which is sometimes the case.

In using this invention the Z of the protractor is placed on the hydrographic star chart, either on the Northern or Southern Hemispheres, over the intersection of the declination circle equal to the local latitude and the local sideral time equal to the right ascension, as shown on the chart, and by making the north and south lines of the protractor pass through the proper pole that is coincident with the north and south line of the star chart we may read off the approximate altitude and proper azimuth of any star shown on the chart.

By using the star chart in combination with a protractor having a movable zenith, the necessity of making any calculations between thirty and sixty degrees of latitude is not necessary for practical purposes. Due to the curves being constructed to forty degrees latitude, the error is greatest at places on the chart at right angles to the north and south lines, whereas near the meridian the error is a minimum.

Although a star chart of the Northern Hemisphere has been shown the protractor is clearly applicable to a star chart of the Southern Hemisphere, it being only necessary to make north the south when using the chart of the South Hemisphere and change east to west on the protractor; that is, the numbers zero to three hundred sixty degrees running in the opposite direction.

To illustrate the working of the protractor reference may be had to Fig. 2, wherein it will be noted that, assuming the local latitude to be forty degrees indicated on the star chart by one of the declination circles, and the local sideral time, for example say five hours, the zenith of the protractor being placed at the intersection of these two points and the north and south line of the protractor coincident with the north and south line of the star chart, the approximate altitude and azimuth of any star on the chart may be read, the same showing clearly through the transparent protractor.

Although the invention has been illustrated and described in connection with the Hydrographic Office star chart of the Navy Department, applicant does not wish to limit the same to this specific form of chart, as the same may be used in connection with other charts of a similar character.

What I claim is:

1. A star identification protractor for use in connection with star charts, comprising a transparent plate provided with ellipses and intersecting curves, said curves radiating from the center of the protractor, the ellipses and curves representing the shape and relative positions of the imaginary altitude circles and azimuth curves of the earth's sphere, stereographically projected on the plane of the equator from any zenith.

2. A star identification protractor for use in connection with star charts, comprising a transparent plate provided with ellipses and intersecting curves, the ellipses and curves representing the shape and relative positions of the imaginary altitude circles and azimuth curves of the earth's sphere for each five degree change of latitude, stereographically projected on the plane of the equator from any zenith.

3. A star identification protractor for use in connection with star charts, comprising a transparent plate provided with ellipses and intersecting curves, the ellipses and curves representing the shape and relative positions of the imaginary altitude circles and azimuth curves of the earth's sphere for each five degree change of latitude, indicated by the ellipses, and of the declination and hour angle of each five degrees of latitude and ten degrees change of azimuth, indicated by the intersecting azimuth curves, said altitude ellipses and azimuth curves resulting from a stereographic projection from any zenith on the plane of the equator.

4. A star identification protractor of transparent material for use in connection with star charts, having drawn thereon ellipses and intersecting curves, the ellipses and curves representing the shape and relative positions of the imaginary altitude circles and azimuth curves of the earth's sphere for each five degree change of latitude, indicated by the ellipses, and of the declination and hour angle of each five degrees of latitude and ten degree change of azimuth, indicated by the intersecting azimuth curves, said altitude ellipses and azimuth curves being projected from a zenith on a latitude of forty degrees.

In testimony whereof I affix my signature.

JOHN JAMES McCRACKEN.